(12) United States Patent
Fu et al.

(45) Date of Patent: Oct. 24, 2006
(10) Patent No.: US 7,125,157 B2

(54) BACKLIGHT UNIT AND LIQUID CRYSTAL DISPLAY UTILIZING THE SAME

(75) Inventors: Shih-Che Fu, Chiayi (TW); Ting-Shih Hsu, Taoyuan (TW); Juei-Lung Huang, Changhua (TW)

(73) Assignee: AU Optronics Corp., Hsinchu (TW)

( * ) Notice: Subject to any disclaimer, the term of this patent is extended or adjusted under 35 U.S.C. 154(b) by 121 days.

(21) Appl. No.: 10/902,914

(22) Filed: Jul. 30, 2004

(65) Prior Publication Data

US 2005/0254236 A1 Nov. 17, 2005

(30) Foreign Application Priority Data

May 13, 2004 (TW) .............................. 93113451 A

(51) Int. Cl.
*F21V 7/04* (2006.01)

(52) U.S. Cl. ...................... 362/632; 362/630; 362/633; 349/58

(58) Field of Classification Search ................ 362/632, 362/633, 634; 349/58

See application file for complete search history.

(56) References Cited

U.S. PATENT DOCUMENTS

| | | | | |
|---|---|---|---|---|
| 6,175,396 | B1 * | 1/2001 | Kim et al. | 349/58 |
| 6,773,127 | B1 * | 8/2004 | Kao | 362/627 |
| 6,835,961 | B1 * | 12/2004 | Fukayama | 257/84 |
| 6,847,417 | B1 * | 1/2005 | Kim | 349/58 |
| 2002/0024623 | A1 * | 2/2002 | Kim et al. | 349/58 |
| 2005/0243238 | A1 * | 11/2005 | Cha et al. | 349/58 |

FOREIGN PATENT DOCUMENTS

| | | |
|---|---|---|
| TW | 449048 | 8/2001 |
| TW | 552440 | 9/2003 |

* cited by examiner

*Primary Examiner*—Ali Alavi
*Assistant Examiner*—Hargobind S. Sawhney
(74) *Attorney, Agent, or Firm*—Thomas, Kayden, Horstemeyer & Risley

(57) ABSTRACT

A backlight unit for a liquid crystal display. The backlight unit comprises a frame, a first supporting portion, a second supporting portion, and a film. The film comprises a first constraining portion and a second constraining portion. The film is positioned on the frame by the first and the second supporting portion passing through the first and the second constraining portion, respectively. When the frame is disposed in a first position, the first supporting portion partially contacts an inner wall of the first constraining portion for positioning the film. When the frame is disposed in a second position, the second supporting portion partially contacts an inner wall of the second constraining portion for positioning the film. An LCD utilizing the backlight unit is also disclosed.

23 Claims, 11 Drawing Sheets

BACKLIGHT UNIT AND LIQUID CRYSTAL DISPLAY UTILIZING THE SAME

BACKGROUND

The invention relates to a backlight unit and a liquid crystal display, and in particular to a backlight unit with a film positioning structure.

Liquid crystal displays are used in a variety of electronic devices, including personal digital assistant (PDA), notebook and desktop computer monitors, mobile phones, and TVs. Some liquid crystal displays are rotatable between different angles, such as, from 0° to 90°, 180°, or 270°. Larger panels, however, causes weight to increase accordingly, incurring a load problem during rotation.

FIG. 1A is a schematic view of a conventional backlight unit 10A for a liquid crystal display, disclosed in Taiwan patent No. 449048. In FIG. 1A, the backlight unit 10A comprises at least one light source (not shown), a plurality of optical films 120, a frame 15, and a fixing structure for the optical films 120. The light source is disposed between the optical films 120 and the frame 15. Light emitted by the light source passes through the optical films 120 such as a diffusion sheet, a prim sheet, and the like, thereby uniformly distributing the light. Note that FIG. 1A eliminates the upper and lower housings and the panel to clearly show the backlight unit 10A.

Extended portions 121, 122, 123, and 124 extend from a periphery of each optical film 120. Each extended portion 121, 122, 123, and 124 comprises holes 121a, 122a, 123a, 124a in the centers thereof. The frame 15 comprises four grooves 151, 152, 153, and 154, respectively corresponding to the extended portions 121, 122, 123, and 124. Protrusions 151a and 152a are respectively formed in the grooves 151 and 152, and hooks 153a and 154a are respectively formed in the grooves 153 and 154. When fixing the optical films 120 to the frame 15, the protrusions 151a and 152a and the hooks 153a and 154a pass through the holes 121a, 122a, 123a, 124a of the extended portions 121, 122, 123, and 124 such that the extended portions 121, 122, 123, and 124 are respectively disposed in the grooves 151, 152, 153, and 154. Thus, the optical films 120 are securely fixed in the frame 15.

Although the films 120 are securely fixed in the frame 15, manufacturing processes, such as, modeling of the grooves and fixing elements such as hooks and protrusions is complicated. The capital cost is thus increased. Furthermore, if temperature varies, the optical films 120 may expand or contract. As a result, stress is concentrated at the four fixing points at corners of the films 120; hence, Mura defects occur accordingly.

Taiwan patent No. 552440 attempts to solve the above mentioned problem. The backlight module 10B has an improved fixing structure for the optical films to prevent Mura defects. As shown in FIGS. 1B and 1C, the optical films 120 are disposed above the frame 15b. Only one edge of each optical film 120 comprises an extended portion 125 with a hole 125b formed thereon. Before assembling the optical films 120, a jig or other tool is required to fix each optical film 120 to align the extended portion 125 to a groove 150 of the frame 15b. After the optical films 120 are installed on the frame 15b, another fixing element such as a pin 120a and fixing base 120b are required to secure the optical films 150 thereon. Although the optical films 120 are securely fixed, additional time is required for the installing and detaching process. Moreover, alignment is difficult and requires additional alignment tools and jigs.

Furthermore, when positioning at different angles, for example, rotating the liquid crystal display to 180°, all the weight of the optical films 120 are concentrated at the single fixing point P. Since the fixing position is asymmetrical, during expansion and contraction of the films, stress is concentrated on the fixing point P, thus causing deformation of the optical films 120. This also results in Mura defects and uneven optical efficiency.

SUMMARY

Thus, an embodiment of the invention provides a backlight unit for a liquid crystal display. The backlight unit includes a frame, a first supporting portion, a second supporting portion, and a film. The film comprises a first constraining portion and a second constraining portion. The film is positioned on the frame by the first and the second supporting portion passing through the first and the second constraining portion, respectively. When the frame is disposed in a first position, the first supporting portion partially contacts an inner wall of the first constraining portion for positioning the film. When the frame is disposed in a second position, the second supporting portion partially contacts an inner wall of the second constraining portion for positioning the film. An LCD utilizing the backlight unit is also disclosed.

The first constraining portion comprises a hole or a groove, and the second constraining portion comprises a hole or a groove.

The first constraining portion and second constraining portion are respectively formed on opposite edges of the film.

The backlight unit further comprises a third supporting portion and a fourth supporting portion disposed on the frame, and the film further comprises a third constraining portion and a fourth constraining portion respectively formed on opposite corners of the film; and the third supporting portion and the fourth supporting portion pass through the first constraining portion and the second constraining portion, respectively.

The film further comprises a third constraining portion and a fourth constraining portion respectively formed on adjacent corners of the film. The third supporting portion and the fourth supporting portion pass through the first constraining portion and the second constraining portion, respectively.

The first constraining portion and the second constraining portion are respectively formed on opposite corners of the film or on adjacent corners of the film.

The first and second constraining portions are symmetrically arranged with respect to a center point of the film.

When the frame is disposed in the second position, a first gap is formed between the first supporting portion and the first constraining portion, and the first gap is an allowance for film expansion or contraction due to temperature variation. When the frame is disposed in the first position, a second gap is formed between the second supporting portion and the second constraining portion, and the second gap is an allowance for film expansion or contraction due to temperature variation.

The first supporting portion and the second supporting portion each comprises a protrusion, a cylinder, or a cuboid.

The first and the second constraining portions are circular, elliptical, rectangular, rectangular with rounded corners, or polygonal.

When the frame is disposed at the first position, the first constraining portion and the first supporting portion constrain a movement range of the film in a direction perpendicular to a gravity-acting direction, and the frame and the first supporting portion constrain the movement range of the film in an extending direction of the first supporting portion.

Furthermore, when the frame is disposed at the second position, the second constraining portion and the second supporting portion constrain a movement range of the film in a direction perpendicular to a gravity-acting direction, and the frame and the second supporting portion constrain the movement range of the film in an extending direction of the second supporting portion.

In an embodiment, when the first constraining portion is elliptical, and when the frame moves to the first position or the second position, a long axis of the elliptical first constraining portion corresponds to a direction of the weight of the frame pulling downwards, and a movement range of the first supporting portion is constrained by a short axis of the elliptical first constraining portion.

The frame further comprises a lamp holder, and the first supporting portion and the second supporting portion extend from the lamp holder toward the film.

The invention also provides an LCD utilizing the backlight unit.

A detailed description is given in the following embodiments with reference to the accompanying drawings.

BRIEF DESCRIPTION OF THE DRAWINGS

Embodiments of the invention can be more fully understood by reading the subsequent detailed description and examples with references made to the accompanying drawings, wherein.

DETAILED DESCRIPTION

Figure 1A:
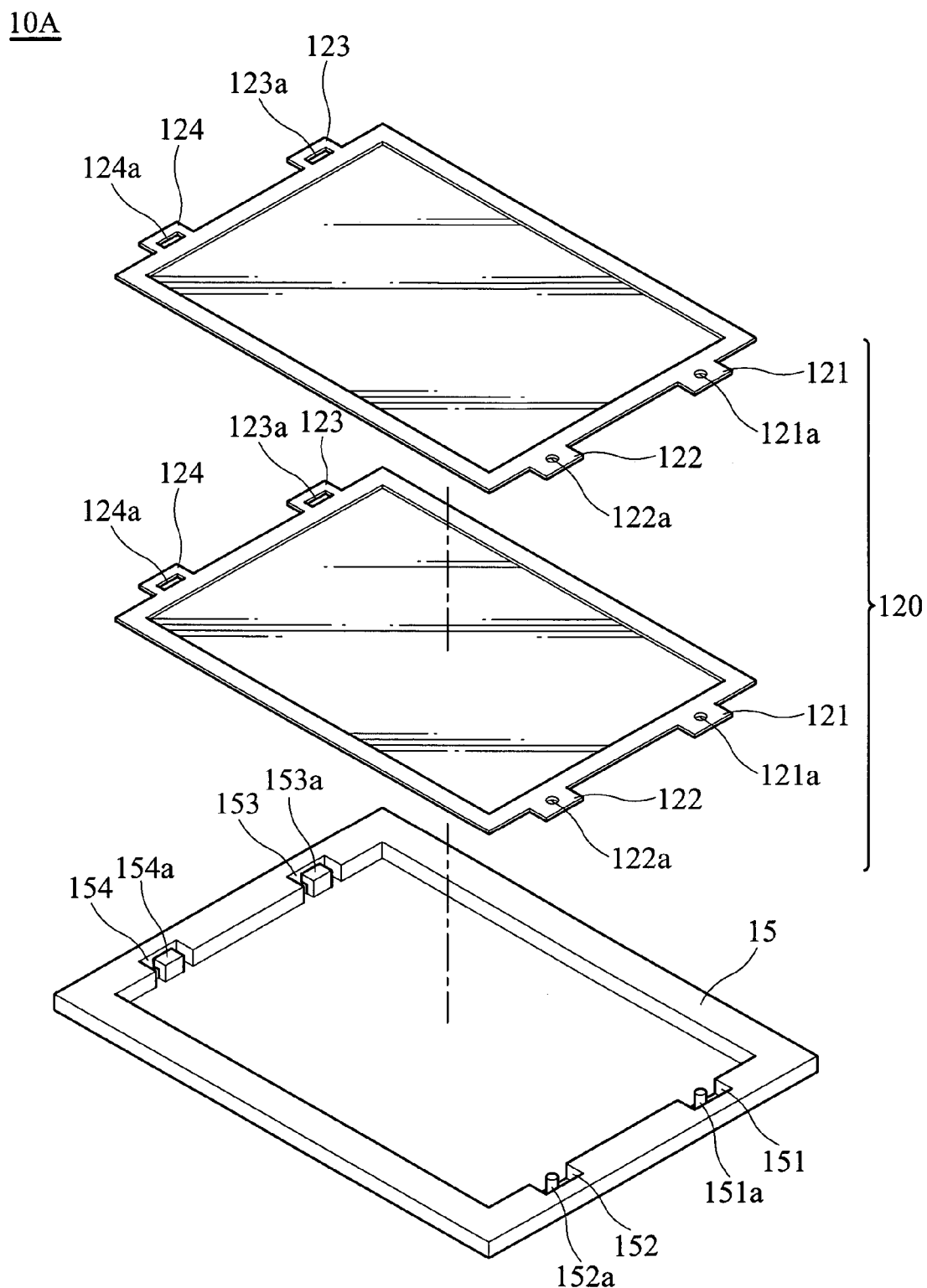
FIG. 1A is a schematic exploded view of a conventional backlight unit of a liquid crystal display disclosed by Taiwan patent No. 449048.
Figure 1B:
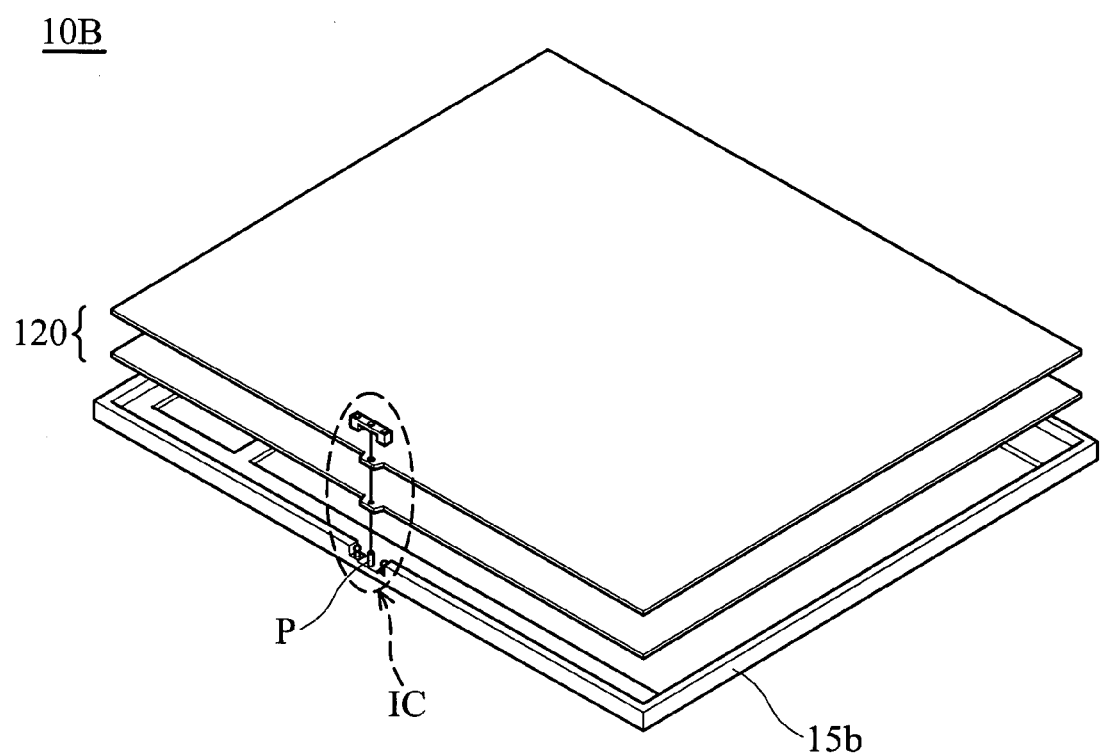
FIG. 1B is a schematic exploded view of a conventional backlight unit of a liquid crystal display disclosed by Taiwan patent No. 552440.
Figure 1C:
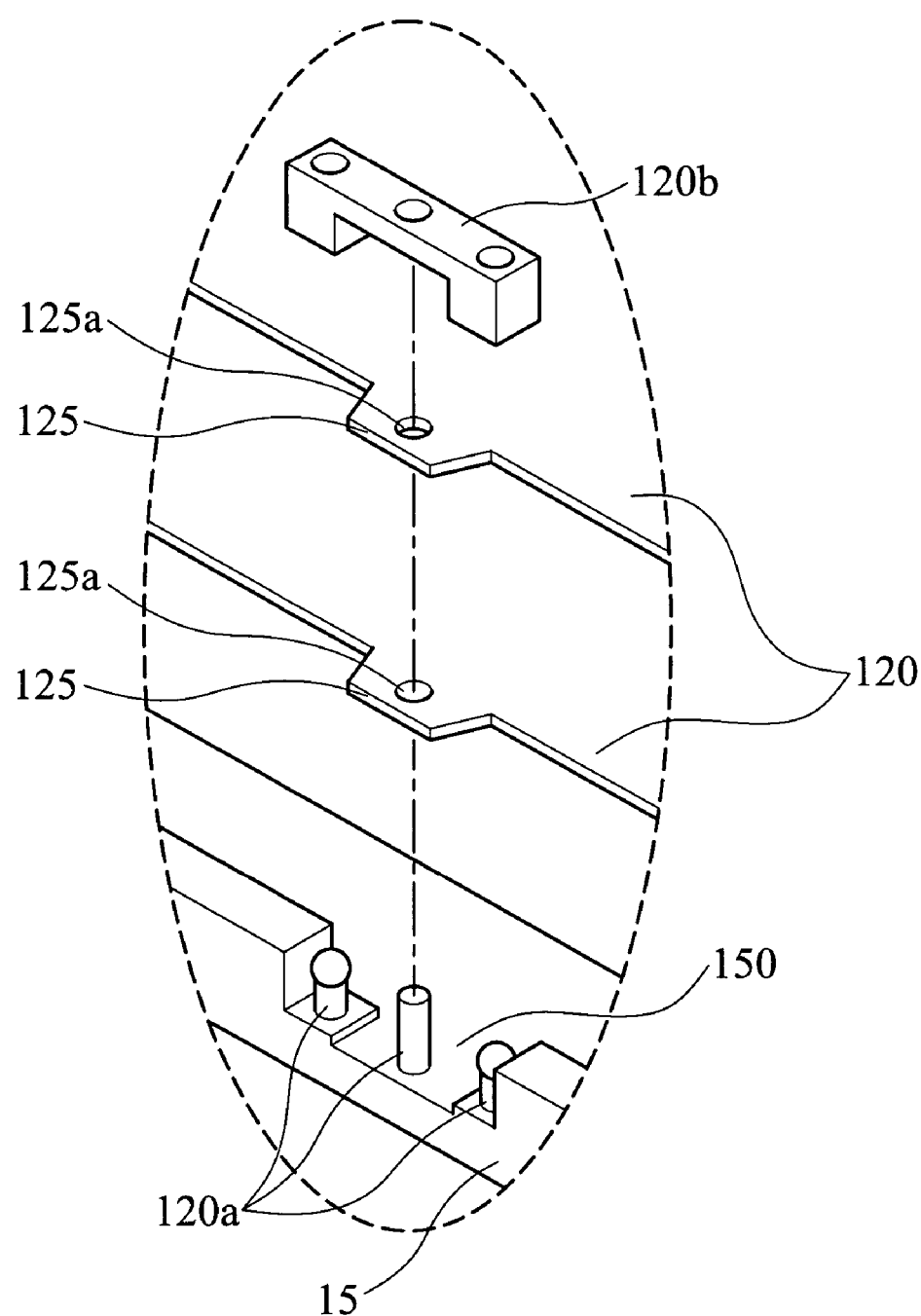
FIG. 1C is a local enlarged view of FIG. 1B.
Figure 2A:
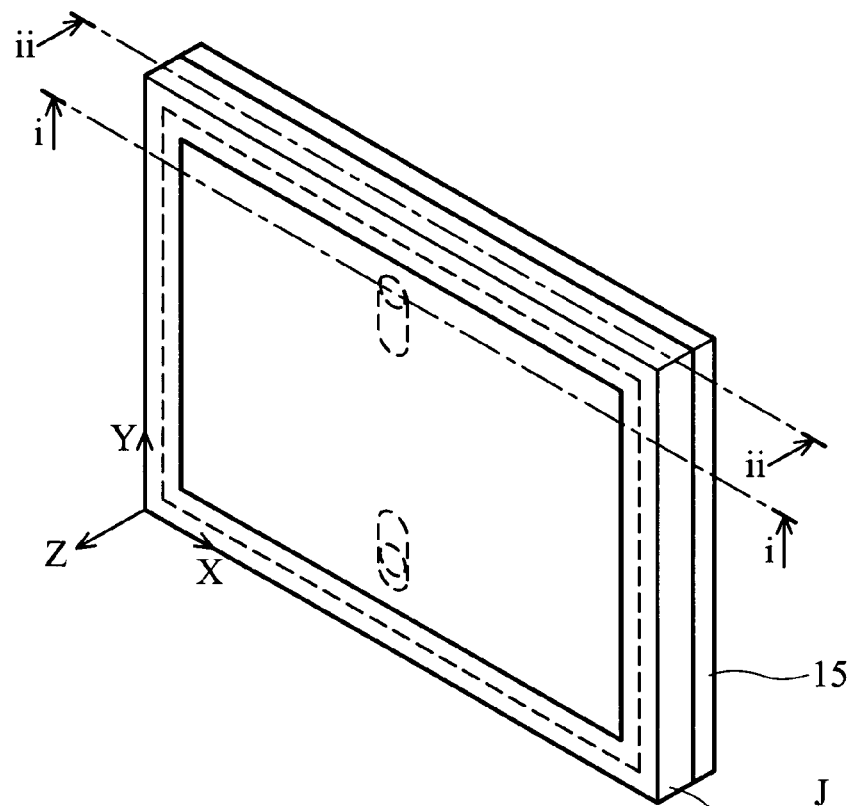
FIG. 2A is a schematic of a liquid crystal display with a backlight unit of an embodiment of the invention.
Figure 2B:
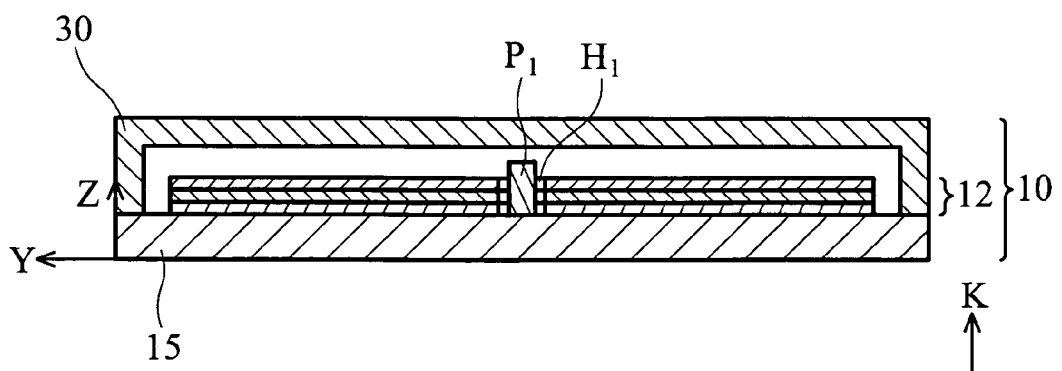
FIG. 2B is a cross section of FIG. 2A along line i—i according to an embodiment of the invention.

FIG. 2A is a schematic perspective view of a liquid crystal display 200 of an embodiment of the invention. FIG. 2B is a cross section of FIG. 2A along line i—i according to an embodiment of the invention.

The liquid crystal display 200 comprises a housing 30 and a backlight unit 10 disposed therein. The backlight unit 10 comprises a frame 15, a plurality of optical films 12, and a pair of supporting portions $P_1$, as shown in FIG. 2B. Each optical film 12a comprises a pair of holes $H_1$. Note that in FIG. 2B only a corresponding pair of the hole $H_1$ and the supporting portion $P_1$ are visible. The holes are referred to as constraining portions as they constrain the movement range of the supporting portions. The holes are formed along the gravity-acting directions of the frame 15 and the housing 30.

The supporting portion $P_1$ comprises plastics, metal or other materials. The supporting portion $P_1$ protrudes from the frame 15, correspondingly passing through the hole $H_1$ on the optical films 12 to position optical films 12 on the frame 15. Since the embodiments of the invention focus on a positioning structure of the optical films 12 in the backlight unit 10, other elements of the backlight unit 10 and liquid crystal display 200 are omitted.

In FIG. 2A, the symbols "I, J, K" represent fixed orthogonal coordinates. The liquid crystal display 200 is assumed to be disposed on a plane IJ according to the coordinates IJK. The plane IJ is parallel to the gravity-acting direction. Other movable coordinates XYZ move or rotate with the liquid crystal display 200. The coordinates XYZ defines the three-dimensional shape of the liquid crystal display 200. Thus, the axis X corresponds to the length of the optical films 12 or the frame 15. The axis Y corresponds to the width of the optical films 12 or the frame 15. The axis Z corresponds to an extending direction of the supporting portion $P_1$ of the frame 15 through the hole $H_1$ on the optical films 12.

In the following embodiments, the liquid crystal display 200 may rotate according to the fixed coordinates IJK on a plane IJ about the axis K. A detailed description of different positions of the liquid crystal display 200 and various combinations of the frame 15 and the optical films 12 is provided in the following.

Figure 3A:
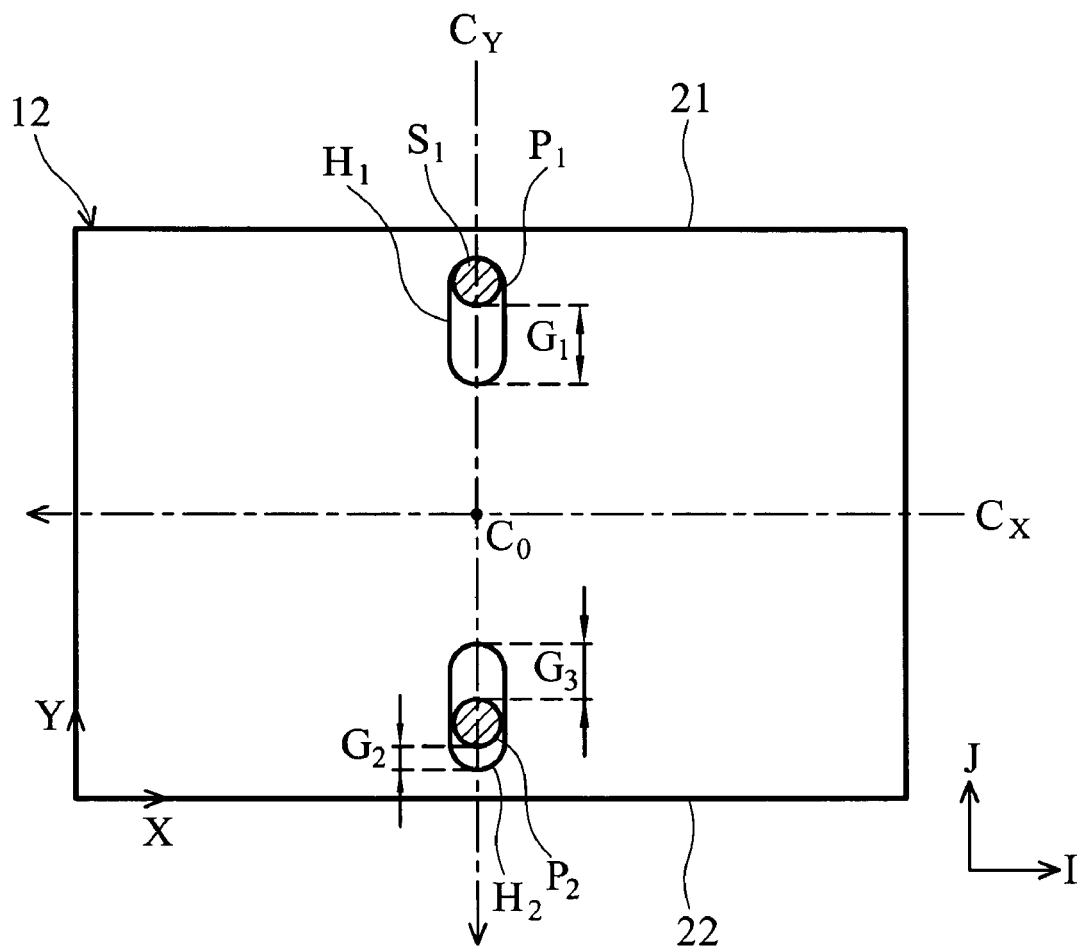
FIG. 3A is a cross section of FIG. 2A along line ii—ii of a first embodiment of the invention, wherein the films and the supporting portions are connected at a first position.
Figure 3B:
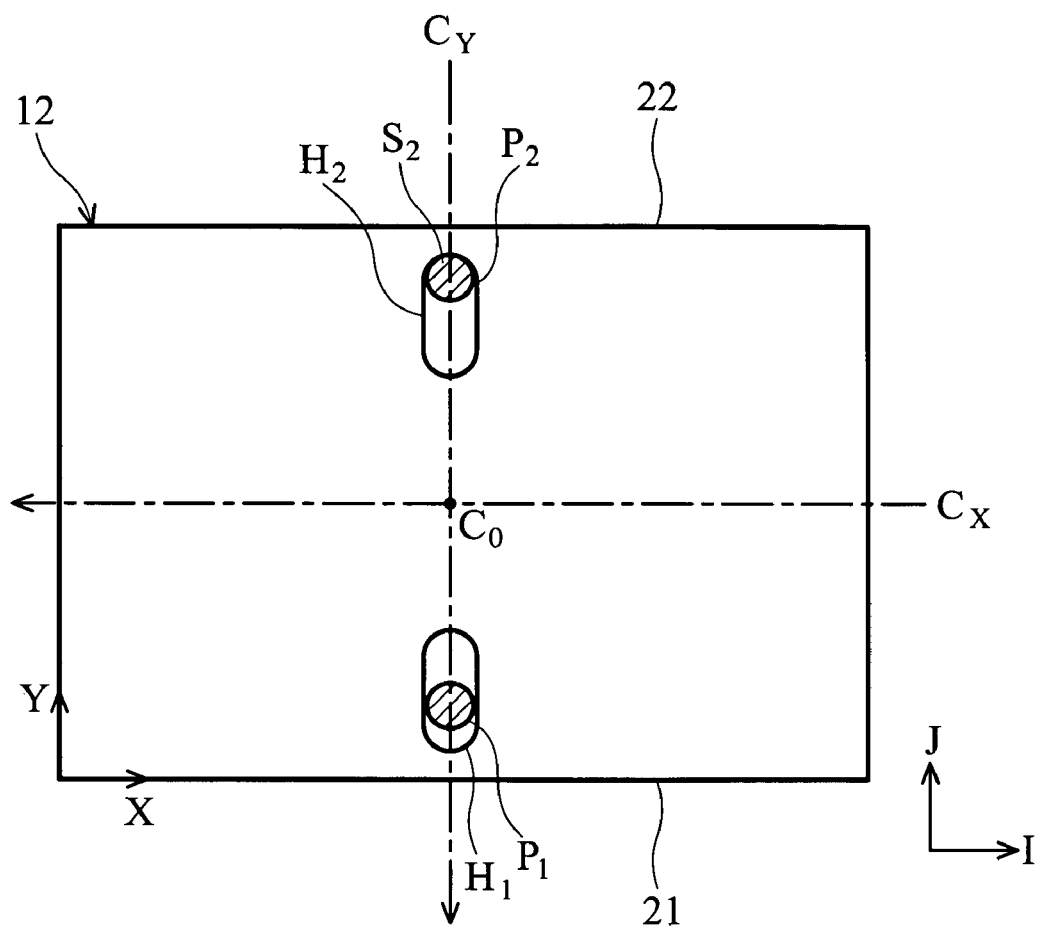
FIG. 3B is another schematic plan view of the structure related to FIG. 3A when the films and the supporting portions are at a second position.

FIGS. 3A and 3B are plan views of the optical films and the supporting portions of a first embodiment of the invention. Note that FIG. 3A is a cross section of FIG. 2A along line ii—ii, eliminating other elements in the backlight unit 10. FIG. 3B is a schematic view of a variation of FIG. 3A.

In FIG. 3A, the optical films 12 are connected to the frame (not shown) via the supporting portions $P_1$ at a first position. FIG. 3B shows the optical films 12 at a second position. The first position is referred to as an initial position of the housing 30, suspended on a plane IJ such that the axis Y of the optical films 12 corresponds to the axis J. The second position is in a suspended position when the housing 30 rotates with respect to the axis K from the first position to 180°.

The first and second supporting portions $P_1$ and $P_2$ penetrating the first and second holes $H_1$ and $H_2$, respectively, thereby fixing the optical films 12 on the frame 15, are more clearly shown in the cross sectional view in FIG. 2B. Additionally, the frame 15 comprises a lamp holder (not shown), and the supporting portions extend from the lamp holder and protrude from the frame 15 to support the optical films 12.

The optical films 12 comprise a first edge 21, a second edge 22, and a central point $C_0$. The first and the second edges 21 and 22 are disposed opposing each other. The central point $C_0$ is the geometric center of the optical film 12. Axes $C_X$ and $C_Y$ intersect each other at the central point $C_0$. Specifically, the axis $C_Y$ passes through both supporting portions $P_1$ and $P_2$. The first and the second holes $H_1$ and $H_2$ are symmetrical with respect to the central point $C_0$. The first and the second holes $H_1$ and $H_2$ are located in vicinity of the first edge 21 and the second edge 22, respectively. That is, the holes are formed on the periphery of the optical films 12. Moreover, when the first and second holes $H_1$ and $H_2$ are elliptical, and the frame 15 moves to the first position or the second position, the long axes of the elliptical first and second holes correspond to the axis $C_Y$ with respect to the axis $C_X$, and movement range of the first supporting portion is constrained by a short axis of the elliptical first hole. Note that the axis $C_Y$ is parallel to the gravity-acting direction of the optical films 12.

When the frame 15 is disposed at the first position (FIG. 3A), the first edge 21 is an upper edge of the optical film 12. The second edge 22 is a lower edge. Due to the weight of the optical film 12, the first supporting portion $P_1$ partially contacts an inner wall S1 of the first hole $H_1$ to position the optical film 12.

The symbol "$G_1$" represents the dimension of a first gap, which is the remaining portion of the first hole $H_1$ subtracted from the first supporting portion $P_1$. The size of the first gap $G_1$ is determined by the thermal expansion coefficient of the optical film 12, panel temperature, room temperature, manufacturing tolerance, and modeling tolerance. Similarly, the gaps $G_2$ and $G_3$ are the gaps between the second hole $H_2$ and the second supporting portion $P_2$, depending on thermal expansion coefficient of the optical film 12, panel temperature, room temperature, manufacturing tolerance, and modeling tolerance. Thus, the gaps $G_1$, $G_2$, and $G_3$ provide allowance for film expansion and contraction due to temperature variation.

The elliptical shapes of the holes $H_1$ and $H_2$ constrain the movement range of the supporting portions $P_1$ and $P_2$ in directions I and J. When the frame 15 is disposed at the first position, the first supporting portion $P_1$ contacts the first hole $H_1$ to support the optical film 12, and the first hole $H_1$ constrains the first supporting portion $P_1$ in direction I, thereby restricting the movement of the optical film 12 in direction I. The second supporting portion $P_2$ does not support the optical film 12 at the first position with the gap $G_2$ formed along the Y-axis. Thus, when the optical film 12 expands or contracts due to temperature variation, or when the optical film 12 is pulled by self-weight, the second supporting portion $P_2$ doest not contact the second hole $H_2$ of the optical film 12. Since there is no contact between the second supporting portion $P_2$ and the second hole $H_2$, stress does not build therebetween. Moreover, the gaps $G_1$ and $G_2$ allow the optical films 12 to freely expand or contract, thereby preventing Mura defects.

When the frame 15 is rotated to the second position (FIG. 3B) by rotating 180°, the second edge 22 becomes the upper edge, and the first edge 21 becomes the lower edge. The second supporting portion $P_2$ partially contacts the inner wall $S_2$ of the second hole $H_2$ to support the optical films 12. The gap $G_2$ is determined by thermal expansion coefficient of the optical film 12, panel temperature, room temperature, manufacturing tolerance, and modeling tolerance. Thus, at the second position, only the second supporting portion $P_2$ supports the optical film 12. The second hole $H_2$ constrains the movement range of the second supporting portion $P_2$ in direction I. The first supporting portion $P_1$ does not support the optical film 12, leaving a gap $G_1$ therebetween. During expansion or contraction, the gaps $G_1$ and $G_2$ allow the optical films 12 to freely expand or contract, thereby preventing Mura defects.

Note that the first supporting portion $P_1$ and the second supporting portion $P_2$ each comprise a protrusion, a cylinder, or a cuboid. The first hole $H_1$ and the second hole $H_1$ are circular, elliptical, rectangular, rectangular with rounded corners, or polygonal.

The first embodiment has a variation, applicable in large-sized liquid crystal displays. As the size of panel increases, the size of the optical films 12a and the frame also increase. Thus, the number of holes for positioning the films is determined by the size of the liquid crystal display.

Figure 3C:
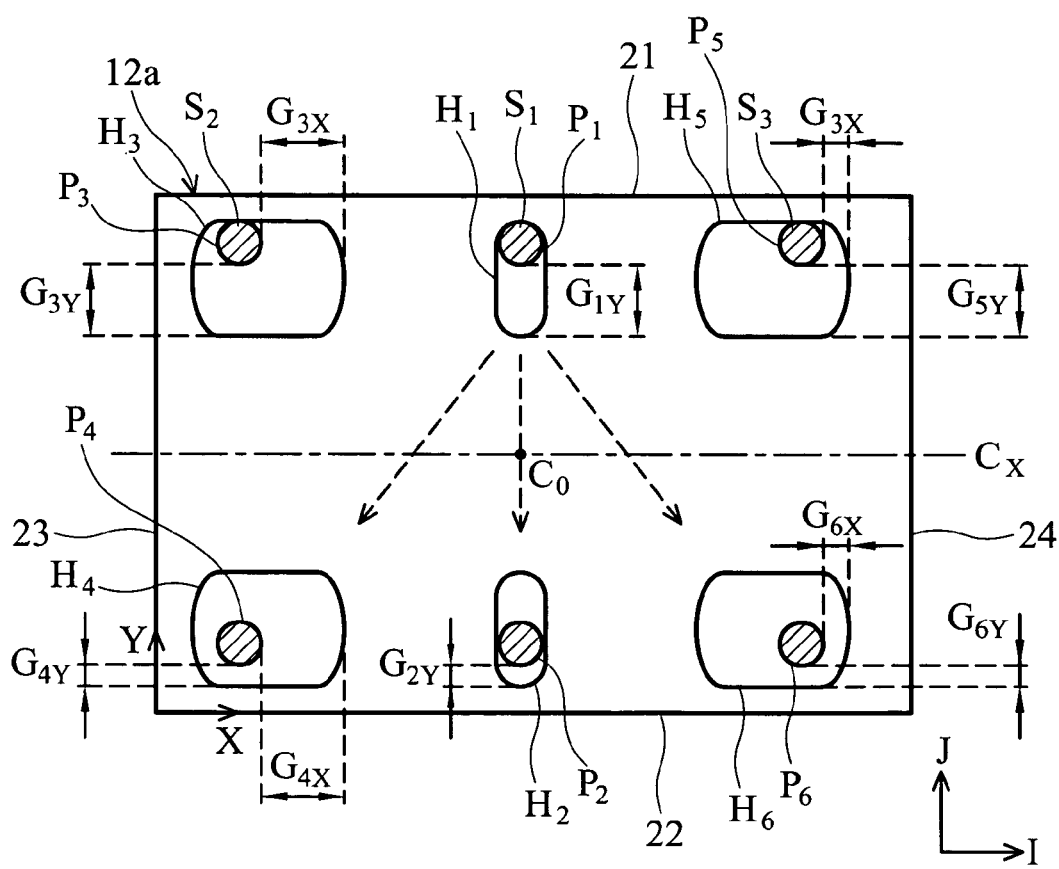
FIG. 3C is a schematic plan view of a variation of the first embodiment.

In this variation, the optical film 12a comprises three pairs of holes defined thereon, as shown in FIG. 3C. That is, except for the above mentioned first hole $H_1$ and second hole $H_2$, another pair comprising the third hole $H_3$ and the fourth hole $H_4$ are respectively defined on the adjacent corners of the edge 23 of the optical film 12a, and another pair comprising the fifth hole $H_5$ and the sixth hole $H_6$ are respectively defined on the adjacent corners of the edge 24 of the optical film 12a. When the liquid crystal display is suspended at the first position, the holes $H_3$, $H_1$, and $H_5$ at the edge 21 of the optical film 12a become the constraining portions to restrict the movement of the optical film 12a. The edge 21 becomes an upper edge and the other holes $H_4$, $H_2$, and $H_6$ are located at the opposite edge 22, the lower edge. As shown, the holes $H_3$, $H_1$, and $H_5$ and the holes $H_4$, $H_2$, and $H_6$ are symmetrically arranged with respect to the central point $C_0$ on the axis $C_X$ in direction X.

The frame, not shown, also comprises three pairs of supporting portions. Each supporting portion extends from the lamp holder of the frame. Except the first and the second supporting portions $P_1$ and $P_2$ as mentioned in the first embodiment, another pair comprising supporting portions, the third and the fourth supporting portions $P_3$ and $P_4$ respectively penetrate the third hole $H_3$ and the fourth hole $H_4$. Another pair comprising supporting portions, the fifth and the sixth supporting portions $P_5$ and $P_6$ respectively penetrate the fifth hole $H_5$ and the sixth hole $H_6$. The supporting portions $P_1$, $P_2$, $P_3$, $P_4$, $P_5$, and $P_6$ comprise transparent plastic, metal or other materials.

In this variation, the first and the second holes $H_1$ and $H_2$ are elliptical. The third, fourth, fifth, and sixth holes $H_3$, $H_4$, $H_5$, and $H_6$ are rectangular with rounded corners, different from the first and the second holes.

The shapes of the holes determine the movable range of the supporting portions, thereby constraining the supporting portions.

Since the holes $H_1$ and $H_2$ are elliptical, the short axes of the holes $H_1$ and $H_2$ are slightly larger than the radii of the supporting portions $P_1$ and $P_2$ such that the supporting portions $P_1$ and $P_2$ are immovable in direction I, but can move in direction J.

Additionally, the supporting portions $P_3$, $P_4$, $P_5$, and $P_6$ pass through the rectangular holes $H_3$, $H_4$, $H_5$, and $H_6$ with rounded corners, movable in direction I or J. Thus, at the first position, only the supporting portions $P_3$, $P_1$, and $P_5$ located at the upper edge partially contact the inner walls $S_3$, $S_1$, and $S_5$ of the holes $H_3$, $H_1$, and $H_5$ to position the optical film 12a.

Moreover, predetermined gaps $G_{1Y}$, $G_{2Y}$, $G_{3X}$, $G_{3Y}$, $G_{4X}$, $G_{4Y}$, $G_{5X}$, $G_{5Y}$, $G_{6X}$, and $G_{6Y}$ are formed between every hole $H_1$, $H_2$, $H_3$, $H_4$, $H_5$, and $H_6$ and every supporting portion $P_1$, $P_2$, $P_3$, $P_4$, $P_5$, and $P_6$. The dimensions of the gaps $G_{1Y}$, $G_{2Y}$, $G_{3X}$, $G_{3Y}$, $G_{4X}$, $G_{4Y}$, $G_{5X}$, $G_{5Y}$, $G_{6X}$, and $G_{6Y}$ are determined by the thermal expansion coefficient of the optical film 12a, panel temperature, room temperature, manufacturing tolerance, and modeling tolerance. As shown in the figures, the first and the second supporting portions $P_1$ and $P_2$ are respectively movable in the gaps $G_{1Y}$, $G_{2Y}$ in direction J. The third, fourth, fifth, and sixth supporting portions $P_1$, $P_2$, $P_3$, $P_4$, $P_5$, and $P_6$ are movable in the gaps $G_{3X}$, $G_{3Y}$, $G_{4X}$, $G_{4Y}$, $G_{5X}$, $G_{5Y}$, $G_{6X}$, and $G_{6Y}$.

Note that the gaps of the third and the fifth supporting portions $P_3$ and $P_5$ located near the sides 23 and 24 close to the upper edge 21 function differently. The gap $G_{3X}$ is an allowance for thermal expansion of the optical film 12a in the direction X. The gap $G_{3Y}$ is an allowance for thermal expansion of the optical film 12a in the direction Y. Similarly, the gap $G_{5X}$ is an allowance for thermal expansion of the optical film 12a in the direction X. The gap $G_{5X}$ is an allowance for thermal expansion of the optical film 12a in the direction Y, and vice versa. Thus, the first supporting portion $P_1$ acts as a central supporting point at the upper edge of the optical film 12a. As a result, the optical film 12a may freely expand or contract upward, downward, leftward, or rightward, as shown by the dashed arrows.

To position the liquid crystal display at various angles, such as rotated to 180° from the initial position, the holes are symmetrically arranged with respect to the central point $C_0$, and thus, the position of the optical films can be correctly maintained. At the upside down position, the second edge 22 becomes the upper edge. The first edge 21 becomes the lower edge. The holes $H_4$, $H_2$, and $H_6$ are the constraining portions for supporting the film. Only the supporting portions $P_4$, $P_2$, and $P_6$ partially contact the inner walls of the holes $H_4$, $H_2$, and $H_6$. Thus, other supporting portions do not support the optical films, allowing thermal expansion and contraction.

In conclusion, the pairs of holes are symmetrically defined on the optical films 12 at opposite corners, adjacent corners, or adjacent edges. The liquid crystal display of the embodiments of the invention can freely rotate from 0° to 360° without causing Mura defects.

FIGS. 4A to 4D are the schematic diagrams of the second embodiment of the invention, showing the relative positions of the supporting portions $P_1'$, $P_2'$, $P_3'$, $P_4'$, $P_5'$, $P_1''$, $P_2''$, $P_3''$, $P_4''$, $P_5''$ when the film is rotated from the first to the second, third, and fourth position. That is, the position angles of 0°, 90°, 180°, and 270° of the liquid crystal display are shown as examples.

Figure 4A:
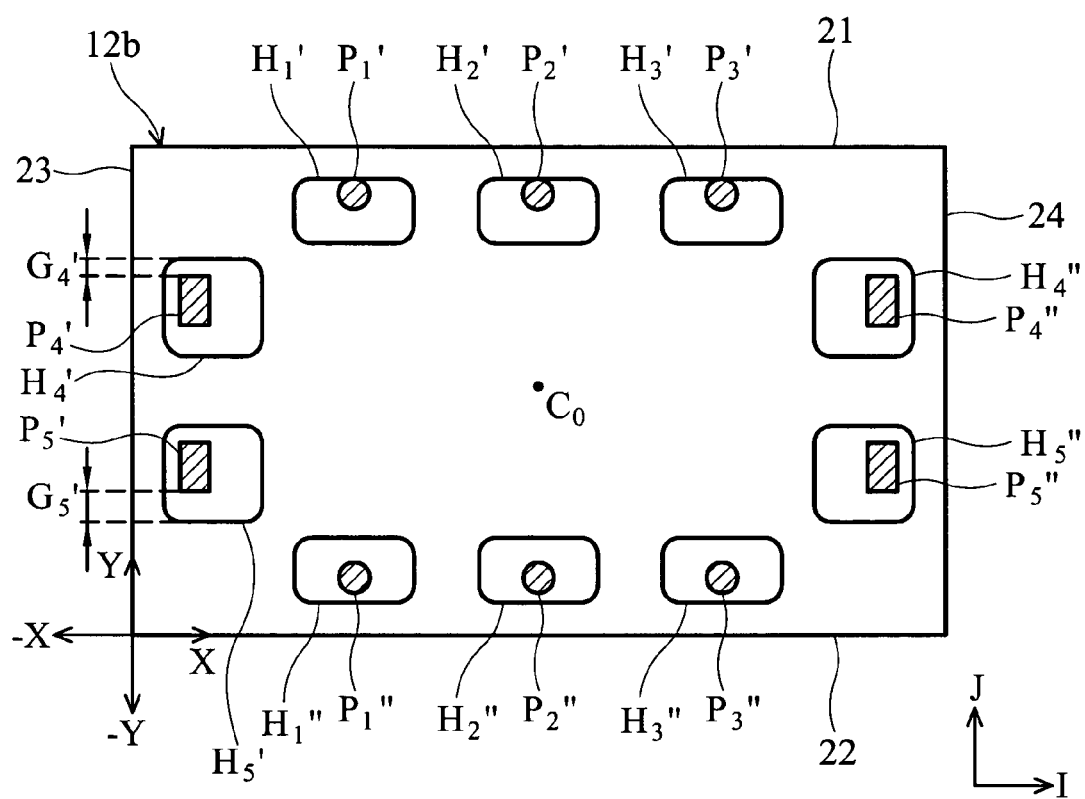
FIG. 4A is a schematic view of the combinations of the films and the supporting portions according to the second embodiment of the invention at a first position.

As shown in FIG. 4A, three pairs of symmetrically arranged holes, $H_1'$ and $H_1''$, $H_2'$ and $H_2''$, $H_3'$ and $H_3''$ are disposed at opposite edges 21 and 22 of the optical film 12b. When the liquid crystal display is disposed at the first position (angle 0°), only the supporting portions $P_1'$, $P_2'$, and $P_3'$ on the frame (not shown) partially contact the inner walls of the holes $H_1'$, $H_2'$ and $H_3'$ to support the optical film 12b.

Figure 4B:
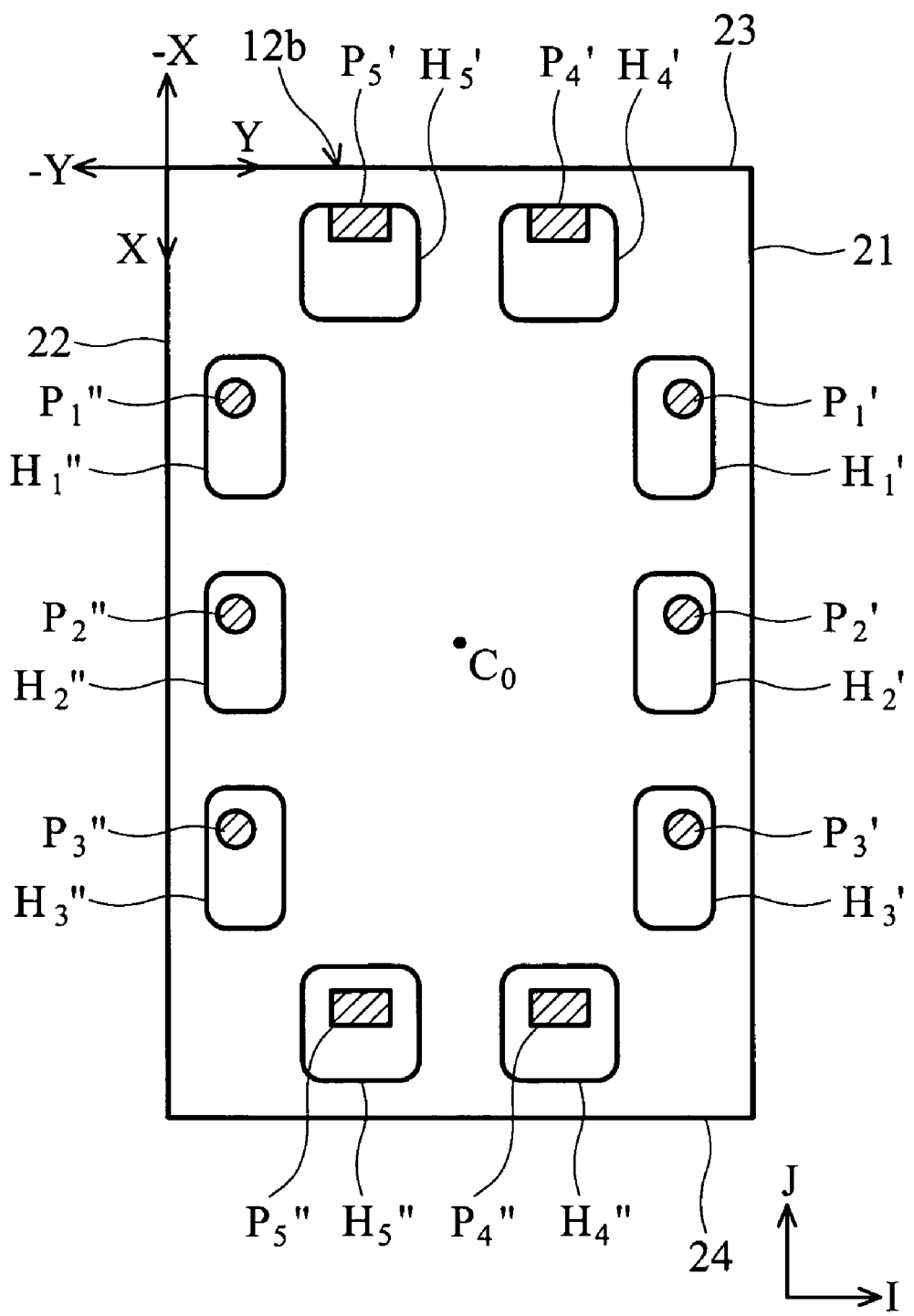
FIG. 4B is another schematic view of the structure related to FIG. 4A when the films and the supporting portions are at a second position.

As shown in FIG. 4B, two pairs of symmetrically arranged holes, $H_4'$ and $H_4''$ and $H_5'$ and $H_5''$, are disposed at the opposite edges 23 and 24 of the optical film 12b. When the liquid crystal display is disposed at the second position, rotated from 0° to 90°, only the supporting portions $P_4'$ and $P_5'$ on the frame (not shown) partially contact the inner walls of the holes $H_4'$ and $H_5'$ to support the optical film 12b.

Figure 4C:
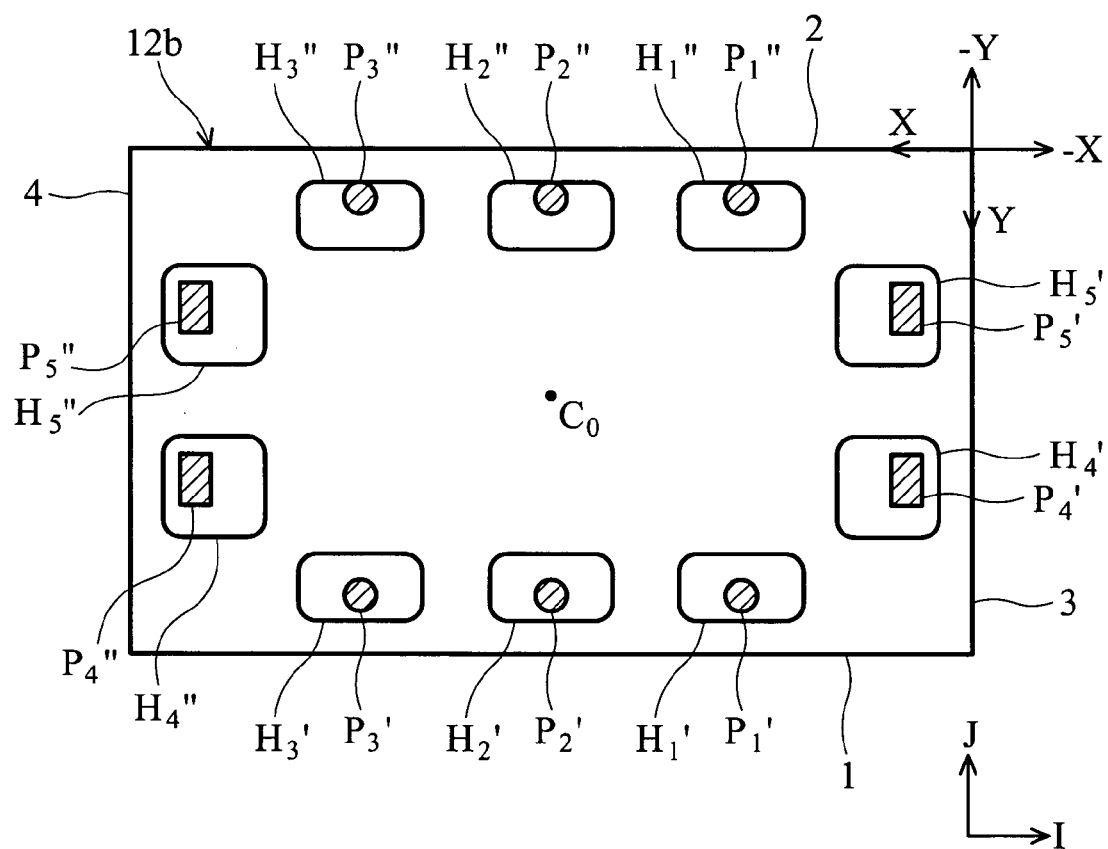
FIG. 4C is another schematic view of the structure related to FIG. 4A when the films and the supporting portions are at a third position.

As shown in FIG. 4C, when the liquid crystal display is disposed at the third position, rotated from 0° to 180°, only the supporting portions $P_1''$, $P_2''$, and $P_3''$ on the frame (not shown) partially contact the inner walls of the holes $H_1''$, $H_2''$ and $H_3''$ to support the optical film 12b.

Figure 4D:
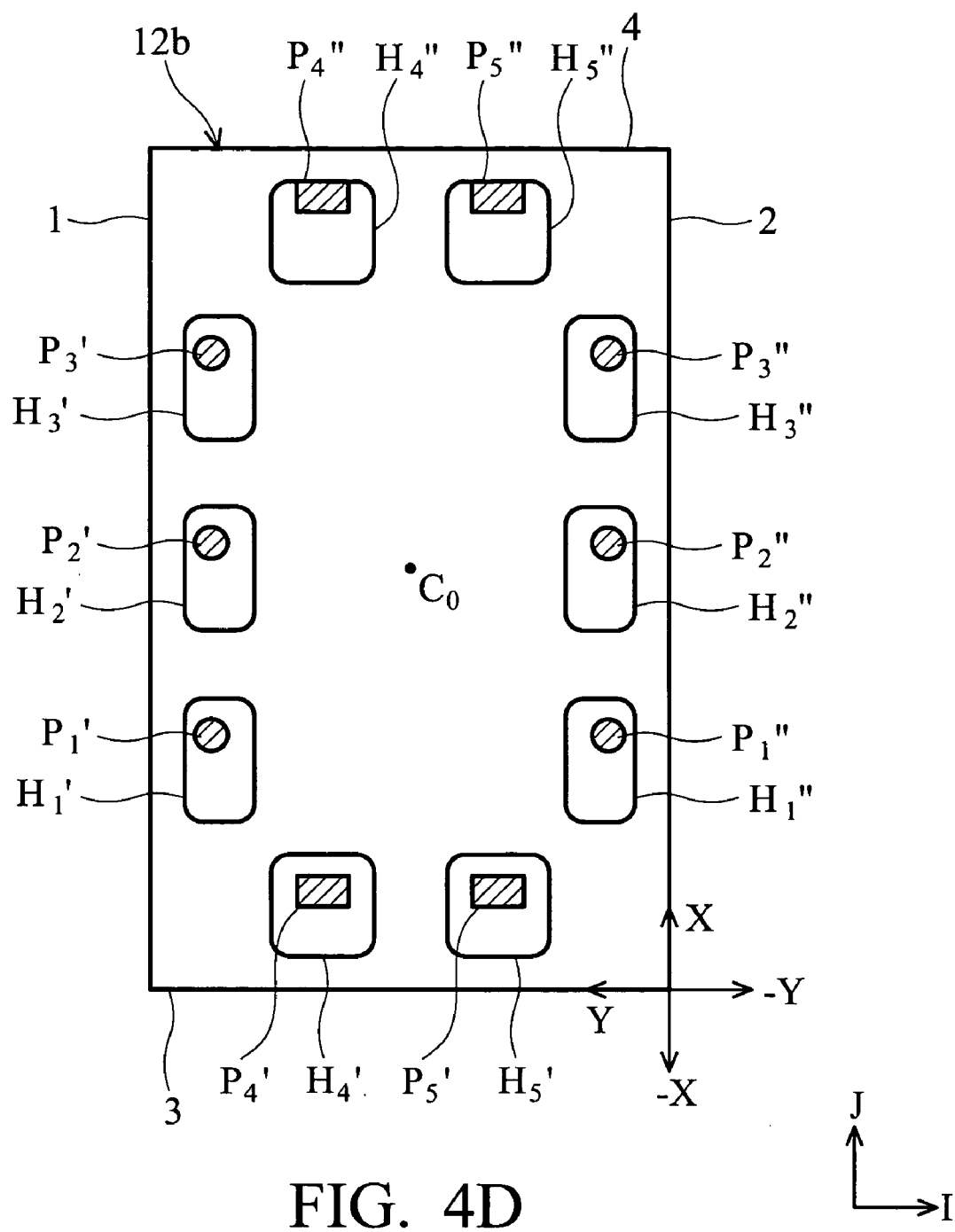
FIG. 4D is another schematic view of the structure related to FIG. 4A when the films and the supporting portions are at a fourth position.

As shown in FIG. 4D, when the liquid crystal display is disposed at the fourth position, rotated from 0° to 270°, only the supporting portions $P_4''$ and $P_5''$ on the frame (not shown) partially contact the inner walls of the holes $H_4''$ and $H_5''$ to support the optical film 12b.

To simplify the figures, only gaps $G_4'$ and $G_5'$ are shown as examples. Gaps are formed between each hole and each supporting portion in both directions X and Y. The gaps are determined by thermal expansion coefficient of the optical films, panel temperature, room temperature, manufacturing tolerance, and modeling tolerance. Thus, when rotating the liquid crystal display, the gaps are the allowable movement range for the supporting portions, preventing direct contact between the holes and the supporting portions. Thus, stress concentration is prevented. The optical films may freely expand or contract without causing Mura defects.

While the invention has been described by way of example and in terms of the preferred embodiments, it is to be understood that the invention is not limited to the disclosed embodiments. To the contrary, it is intended to housing various modifications and similar arrangements (as would be apparent to those skilled in the art). Therefore, the scope of the appended claims should be accorded the broadest interpretation so as to encompass all such modifications and similar arrangements.

What is claimed is:

1. A backlight unit for a liquid crystal display, comprising:
   a frame;
   a first supporting portion, disposed on the frame;
   a second supporting portion, further disposed on the frame; and
   a film comprising a first constraining portion and a second constraining portion, positioned on the frame by the first supporting portion and the second supporting portion passing through the first constraining portion and the second constraining portion, respectively;
   when the frame is disposed in a first position, the first supporting portion partially contacts an inner wall of the first constraining portion for positioning the film, and the second supporting portion does not contact the second constraining portion; and
   when the frame is disposed in a second position, the second supporting portion partially contacts an inner wall of the second constraining portion for positioning the film and the first supporting portion does not contact the first constraining portion.

2. The backlight unit as claimed in claim 1, wherein the first constraining portion comprises a hole or a groove, and the second constraining portion comprises a hole or a groove.

3. The backlight unit as claimed in claim 1, wherein the first constraining portion and the second constraining portion are respectively formed on opposite edges of the film.

4. The backlight unit as claimed in claim 3, further comprising a third constraining portion and a fourth constraining portion disposed on the frame, and the film further comprises a third constraining portion and a fourth constraining portion respectively formed on opposite corners of the film; and the third constraining portion and the fourth constraining portion pass through the first constraining portion and the second constraining portion, respectively.

5. The backlight unit as claimed in claim 3, further comprising a third constraining portion and a fourth constraining portion disposed on the frame, and the film further comprises a third constraining portion and a fourth constraining portion respectively formed on adjacent corners of the film; and the third constraining portion and the fourth constraining portion pass through the first constraining portion and the second constraining portion, respectively.

6. The backlight unit as claimed in claim 1, wherein the first constraining portion and the second constraining portion are respectively formed on opposite corners of the film.

7. The backlight unit as claimed in claim 1, wherein the first constraining portion and the second constraining portion are respectively formed on adjacent corners of the film.

8. The backlight unit as claimed in claim 1, wherein the first constraining portion and the second constraining portion are symmetrically arranged with respect to a center point of the film.

9. The backlight unit as claimed in claim 1, wherein when the frame is disposed in the second position, a first gap is formed between the first supporting portion and the first constraining portion, and the first gap is an allowance for film expansion or contraction due to temperature variation; when the frame is disposed in the first position, a second gap is formed between the second supporting portion and the second constraining portion, and the second gap is an allowance for film expansion or contraction due to temperature variation.

10. The backlight unit as claimed in claim 1, wherein the first supporting portion and the second supporting portion each comprises a protrusion, a cylinder, or a cuboid.

11. The backlight unit as claimed in claim 1, wherein the first constraining portion and the second constraining portion is circular, elliptical, rectangular, rectangular with rounded corners, or polygonal.

12. The backlight unit as claimed in claim 1, wherein when the frame is disposed at the first position, the first constraining portion and the first supporting portion constrain a movement range of the film in a direction perpendicular to a gravity-acting direction, and the frame and the first supporting portion constrain the movement range of the film in an extending direction of the first supporting portion.

13. The backlight unit as claimed in claim 1, wherein when the frame is disposed at the second position, the second constraining portion and the second supporting portion constrain a movement range of the film in a direction perpendicular to a gravity-acting direction, and the frame and the second supporting portion constrain the movement range of the film in an extending direction of the second supporting portion.

14. The backlight unit as claimed in claim 1, wherein the first constraining portion is elliptical, and when the frame moves to the first position or the second position, a long axis of the elliptical first constraining portion corresponds to a direction of the weight of the frame pulling downwards, and a movement range of the first supporting portion is constrained by a short axis of the elliptical first constraining portion.

15. The backlight unit as claimed in claim 1, wherein the frame further comprises a lamp holder, and the first supporting portion and the second supporting portion extend from the lamp holder toward the film.

16. A liquid crystal display, comprising:
   a housing, movable between a first position and a second position; and
   a backlight unit, disposed in the housing, comprising:
      a frame comprising a first supporting portion and a second supporting portion; and
      a film comprising a first constraining portion and a second constraining portion;
   when the frame is disposed in a first position, the first supporting portion supports the first constraining portion for positioning the film, and the second supporting portion does not contact the second constraining portion; and
   when the frame is disposed in a second position, the second supporting portion supports the second constraining portion for positioning the film, and the first supporting portion does not contact the first constraining portion.

17. The liquid crystal display as claimed in claim 16, wherein the first constraining portion and the second constraining portion are holes in circular, elliptical, rectangular, rectangular with rounded corners, or polygonal.

18. The liquid crystal display as claimed in claim 16, wherein when the frame is disposed in the first position, a gap is formed between the second constraining portion and the second supporting portion; and when the frame is disposed in the second position, a gap is formed between the first constraining portion and the first supporting portion.

19. The liquid crystal display as claimed in claim 16, wherein the first constraining portion and the second constraining portion are respectively formed on opposite edges of the film.

20. The liquid crystal display unit as claimed in claim 16, wherein the first constraining portion and the second constraining portion are respectively formed on opposite corners of the film.

21. The liquid crystal display as claimed in claim 16, wherein the first constraining portion and the second constraining portion are respectively formed on adjacent corners of the film.

22. The liquid crystal display as claimed in claim 16, wherein the first supporting portion and the second supporting portion each comprises a protrusion, a cylinder, or a cuboid.

23. The liquid crystal display as claimed in claim 16, wherein angles of rotation between the first position and the second position are 90°, 180°, or 270°.

* * * * *

(12) INTER PARTES REEXAMINATION CERTIFICATE (522nd)
United States Patent
Fu et al.

(10) Number: US 7,125,157 C1
(45) Certificate Issued: Feb. 8, 2013

(54) BACKLIGHT UNIT AND LIQUID CRYSTAL DISPLAY UTILIZING THE SAME

(75) Inventors: Shih-Che Fu, Chiayi (TW); Ting-Shih Hsu, Taoyuan (TW); Juei-Lung Huang, Changhua (TW)

(73) Assignees: AU Optronics Corp., Hsinchu (TW); AU Optronics Corporation America, Houston, TX (US)

Reexamination Request:
No. 95/001,584, Mar. 25, 2011

Reexamination Certificate for:
Patent No.: 7,125,157
Issued: Oct. 24, 2006
Appl. No.: 10/902,914
Filed: Jul. 30, 2004

(51) Int. Cl.
*F21V 7/04* (2006.01)
(52) U.S. Cl. ........... 362/632; 362/630; 362/633; 349/58
(58) Field of Classification Search .................. None
See application file for complete search history.

(56) References Cited

To view the complete listing of prior art documents cited during the proceeding for Reexamination Control Number 95/001,584, please refer to the USPTO's public Patent Application Information Retrieval (PAIR) system under the Display References tab.

*Primary Examiner* — John Heyman

(57) ABSTRACT

A backlight unit for a liquid crystal display. The backlight unit comprises a frame, a first supporting portion, a second supporting portion, and a film. The film comprises a first constraining portion and a second constraining portion. The film is positioned on the frame by the first and the second supporting portion passing through the first and the second constraining portion, respectively. When the frame is disposed in a first position, the first supporting portion partially contacts an inner wall of the first constraining portion for positioning the film. When the frame is disposed in a second position, the second supporting portion partially contacts an inner wall of the second constraining portion for positioning the film. An LCD utilizing the backlight unit is also disclosed.

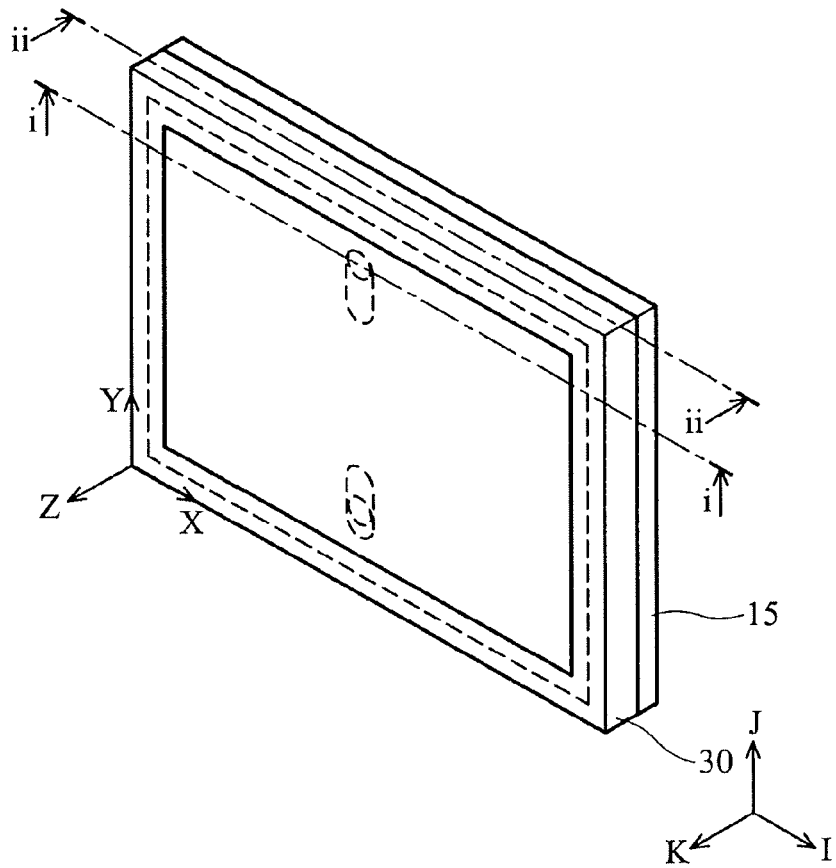

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 1-23 is confirmed.

* * * * *